(12) United States Patent
Stommel

(10) Patent No.: US 7,638,894 B2
(45) Date of Patent: Dec. 29, 2009

(54) METHOD FOR OPERATION OF A WIND ENERGY INSTALLATION

(75) Inventor: Matthias Stommel, Ganderkesee (DE)

(73) Assignee: Daubner & Stommel GbR Bau-Werk-Planung, Ganderkesee (DE)

( * ) Notice: Subject to any disclaimer, the term of this patent is extended or adjusted under 35 U.S.C. 154(b) by 335 days.

(21) Appl. No.: 11/539,127

(22) Filed: Oct. 5, 2006

(65) Prior Publication Data

US 2007/0102939 A1 May 10, 2007

(30) Foreign Application Priority Data

Oct. 10, 2005 (DE) .................. 10 2005 048 805

(51) Int. Cl.
  *F03D 9/00* (2006.01)
  *H02P 9/04* (2006.01)
  *B64C 11/00* (2006.01)

(52) U.S. Cl. .................. 290/55; 290/44; 416/1

(58) Field of Classification Search .................. 290/44, 290/55; 416/7, 202, 228, 238, 240, 1, 31, 416/37, 61; 60/398; 415/4.2, 2.1, 132 B, 415/905, 7

See application file for complete search history.

(56) References Cited

U.S. PATENT DOCUMENTS

| | | | | |
|---|---|---|---|---|
| 2,360,792 A * | 10/1944 | Putnam | ...................... | 290/4 R |
| 4,297,076 A | 10/1981 | Donham et al. | | |
| 4,565,929 A * | 1/1986 | Baskin et al. | .................. | 290/44 |
| 5,315,159 A * | 5/1994 | Gribnau | ........................ | 290/55 |
| 6,582,196 B1 * | 6/2003 | Andersen et al. | ............. | 416/202 |
| 6,619,918 B1 * | 9/2003 | Rebsdorf | ....................... | 416/1 |
| 7,400,055 B2 * | 7/2008 | Nagao | ........................ | 290/44 |

| | | | |
|---|---|---|---|
| 2004/0013524 A1 * | 1/2004 | Wobben | ...................... 416/61 |

(Continued)

FOREIGN PATENT DOCUMENTS

DE     296 12 720 U1     7/1996

(Continued)

OTHER PUBLICATIONS

EP Search Report No. 10 06 02 0891 dated Jan. 30, 2007.

(Continued)

*Primary Examiner*—Julio Gonzalez
(74) *Attorney, Agent, or Firm*—Smith, Gambrell & Russell; Laurence P. Colton

(57) ABSTRACT

A wind energy installation (10) and a method for operation of a wind energy installation (10), with the wind energy installation (10) having a rotor (18) which can be driven by wind, having at least one rotor blade (22), a generator for conversion of the mechanical energy of the rotor (18) to electrical energy, as well as a tower (14) on which the rotor (18) is arranged. At least one measurement variable is measured, preferably more than once, by means of a suitable measurement device during operation of the wind energy installation (10), which measurement variable is a measure of the bending of the rotor blade (22) in the tower direction as a result of a given wind load, and is thus a measure of the risk of the rotor blade (22) colliding with the tower (14) of the wind energy installation (10) as it passes the tower, with at least one operating parameter of the wind energy installation (10) being adjusted as a function of this measurement variable for determination of the rotor blade bending.

10 Claims, 1 Drawing Sheet

U.S. PATENT DOCUMENTS

| | | |
|---|---|---|
| 2004/0067134 A1 | 4/2004 | Beauchamp et al. |
| 2006/0002797 A1* | 1/2006 | Moroz et al. .................. 416/98 |
| 2007/0182162 A1* | 8/2007 | McClintic .................... 290/55 |

FOREIGN PATENT DOCUMENTS

| | | |
|---|---|---|
| DE | 197 31 918 A1 | 7/1997 |
| DE | 198 07 477 C2 | 2/1998 |
| DE | 298 80 145 U1 | 9/1998 |
| DE | 198 07 477 A1 | 4/1999 |
| DE | 100 32 314 C1 | 7/2000 |
| DE | 101 13 038 C2 | 3/2001 |
| DE | 102 01 726 A1 | 1/2002 |
| DE | 102 19 664 A1 | 5/2002 |
| EP | 1 612 414 A | 1/2006 |
| NL | 1 018 670 C2 | 2/2003 |
| WO | WO 01/33075 A | 5/2001 |

OTHER PUBLICATIONS

DE Search Report No. 10 2005 048 805.6 dated Aug. 11, 2006.

* cited by examiner

METHOD FOR OPERATION OF A WIND ENERGY INSTALLATION

STATEMENT OF RELATED APPLICATIONS

This patent application claims convention priority on German Patent Application No. 10 2005 048 805.6 having a filing date of 10 Oct. 2005, which is incorporated herein by this reference.

BACKGROUND OF THE INVENTION

1. Technical Field

The present invention relates to a method for operation of a wind energy installation, with the wind energy installation having a rotor which can be driven by wind, having at least one rotor blade, a generator for conversion of the mechanical energy of the rotor to electrical energy, as well as a tower on which the rotor is arranged. The invention also relates to a wind energy installation for carrying out the method.

2. Related Art

In the case of wind energy installations in which the rotor as well as the rotor blades rotate about an at least approximately horizontal axis, with the rotor being mounted at the upper end of the tower, the rotor blades each successively pass over the area of the tower during operation. During operation, that is to say while the rotor blades are rotating, severe wind loads frequently lead to the rotor blades bending in the direction of the tower. The higher the wind speed which strikes the rotor blades and drives them, the greater is the bending which can be observed on the rotor blades. One other influencing factor for the intensity of the bending movement is, of course, the length of the individual rotor blades. The longer a rotor blade is, the more severely it will bend. Since the trend in wind energy installation design is to construct ever larger wind energy installations with ever longer rotor blades, the intensity of the bending will increase ever further.

In the extreme, the rotor blades even in wind energy installations that are used nowadays bend so severely that this can result in the rotor blade which is passing the tower area touching the tower. In this case, contact with the tower normally leads at least to serious damage to the rotor blade, and possibly also to the tower. In order to prevent such damage, it is known in the prior art on the one hand for the rotor axis to be inclined slightly upwards with respect to the horizontal, so that the distance between the rotor blade and the tower is increased while passing the tower. On the other hand, it is known for the rotor blades to be bent somewhat in the opposite direction to the tower direction after they have been manufactured, in order to counteract any subsequent wind load bending. Despite these measures, contact between the tower and the rotor blades, particularly the rotor blade tips, has still occurred in the past with the described effects.

One object of the present invention is thus to specify a method for operation of a wind energy installation which allows contact between the tower and the rotor blades to be effectively prevented. A further object of the invention is to specify a wind energy installation which operates using this method.

BRIEF SUMMARY OF THE INVENTION

This object is achieved by a method for operation of a wind energy installation in that at least one measurement variable is measured, preferably more than once, particularly preferably continuously, by means of a suitable measurement device during operation of the wind energy installation, which measurement variable is a measure of the bending of the rotor blade in the tower direction as a result of a given wind load, and is thus a measure of the risk of the rotor blade colliding with the tower of the wind energy installation as it passes the tower, with at least one operating parameter of the wind energy installation being adjusted as a function of this measurement variable for determination of the rotor blade bending.

For the purposes of this application, adjustable operating parameters of the wind energy installation are understood as being all feasible parameters which can be adjusted in a wind energy installation, such as the parameters of brake performance and braking processes, the wind incidence angles of the rotor blades, the power output from the wind energy installation, specific operating states such as switched-on and switched-off states and the like, as well as adjustable parameters for devices which are directly or indirectly associated with the wind energy installation.

It is particularly preferable, however, for the wind incidence angle or angles of one or more rotor blades of the wind energy installation to be adjusted as a function of the measurement variable for determination of the rotor blade bending. In the case of a value of the measurement variable which corresponds to major rotor blade bending as a result of a severe wind load, one or more rotor blades can be partially or entirely rotated out of the wind with respect to a given position in order to reduce the wind load acting on the rotor blades. As a consequence of this, the respective distance between the rotor blade and the tower as the rotor blade passes the tower is reduced. The rotor blades can be rotated in a corresponding manner to a greater extent into the wind when the wind load is less. For the purposes of this application, passing the tower means a partial movement of the overall rotation of a rotor blade, specifically that part of the movement during which the rotor blade is at least partially passing over the area of the tower and during which the rotor blade could touch the tower if it were excessively bent.

In one particularly preferred embodiment, if the actual value of the measurement variable for determination of the rotor blade bending is less than or equal to a predetermined minimum value, the further rotation of the rotor blades is suppressed, in particular directly, preferably by braking of the rotor and/or by shutting down or stopping the wind energy installation. Accordingly, if the measurement variable assumes or falls below a critical value such as this in which there is a risk of the rotor blade colliding with the tower in a very short time, any further rotation can be suppressed.

As those skilled in the art in this field will know, there are various measurement variables which may be a measure of the bending of the rotor blade in the tower direction. For example, curvature sensors could be provided on the rotor blades, which each measure specific curvature parameters of these blades. In one particularly preferred embodiment of the present invention, however, the physical distance between the rotor blade and the tower is measured at a predetermined point in the area in which it passes the tower by means of a distance measurement device during operation of the wind installation during a plurality of times for which at least one selected rotor blade, which passes the tower area at a distance from it, passes the tower, and the above-mentioned operating parameter of the wind energy installation is adjusted as a function of the measured distance.

The distance between the rotor blade and the tower while passing the tower is a particularly good measure of the bending of the rotor blade on the basis of a given wind load. The distance can in this case be measured in different areas of the selected rotor blade by means of widely differing measurement devices. In one particular embodiment, the distance between the rotor blade and the tower is measured at the point at which the rotor blade and the tower are closest to one another in the horizontal direction. The distance between the rotor blade and the tower is preferably measured in the area of the rotor blade tip. Normally, the rotor blade tip is subject to the greatest bending as a result of a strong wind load, and will therefore be the first to collide with the tower. Measurement of the distance between this tip and the tower thus allows particularly direct information to be obtained as to whether there is a threat of collisions. If the wind energy installation has a plurality of rotor blades, the respective distance of each rotor blade is preferably measured.

The measurement variable which represents a measure of the bending of the rotor blade in the tower direction, preferably the abovementioned distance between the rotor blade and the tower, can be measured in widely differing ways. This measurement is expediently carried out continuously throughout the entire operating period of the installation, that is to say whenever the rotor is rotating. However, it could also be carried out discontinuously, at predetermined time intervals. In this case, the time profile of the measurement variable can be determined, defined and evaluated. A large number of open-loop/closed-loop control methods are feasible, by means of which the wind energy installation is operated as a function of the measurement variable for determination of the rotor blade bending.

The measurement device can be arranged directly on the tower and/or on the rotor, in particular on the rotor blades of the wind energy installation. However, it can also indirectly be part of the wind energy installation when, for example, this is arranged close to the ground in front of the wind energy installation and is connected to it via data lines. A wide range of arrangements may be used in this case.

A wind energy installation which is suitable for carrying out the operating method described above has a rotor which can be driven by wind, having at least one rotor blade, a generator for conversion of the mechanical energy of the rotor to electrical energy, as well as a tower on which the rotor is arranged, characterized in that the wind energy installation has a measurement device by means of which at least one measurement variable is measured, preferably more than once, during operation of the wind energy installation, which measurement variable is a measure of the bending of the rotor blade in the tower direction as a result of a given wind load, and is thus a measure of the risk of the rotor blade colliding with the tower of the wind energy installation as it passes the tower, and in that a closed-loop and/or open-loop control device are/is provided, by means of which at least one operating parameter of the wind energy installation can be adjusted as a function of this measurement variable for determination of the rotor blade bending. Accordingly, it has a closed-loop and/or open-loop control device by means of which suitable measures, such as adjustment of the wind incidence angle of the rotor blade, can be taken as a function of the measurement variable for determination of the bending of the rotor blade in the tower direction.

If the measurement variable for determination of the bending of the rotor blade is the distance between the rotor blade and the tower while passing the tower, the wind energy installation according to the invention has a distance measurement device. The distance measurement device may, for example, be in the form of a laser-optical, capacitive or inductive distance measurement system. Various other measurement systems are feasible. The distance measurement device is preferably arranged in such a manner that the distance between the rotor blade and the tower can be measured at the point at which the rotor blade and the tower are closest to one another in the horizontal direction. Since, in principle, it is sufficient to define and to measure the time profile of one specific, predetermined distance between the rotor blade and the tower, it is, of course, also possible to use measurement directions other than the horizontal direction.

BRIEF SUMMARY OF THE DRAWING

Further features of the present invention are disclosed in the attached patent claims, in the following description of one preferred exemplary embodiment, and in the attached drawing, in which:

DETAILED DESCRIPTION OF PREFERRED EMBODIMENTS

Figure 1:
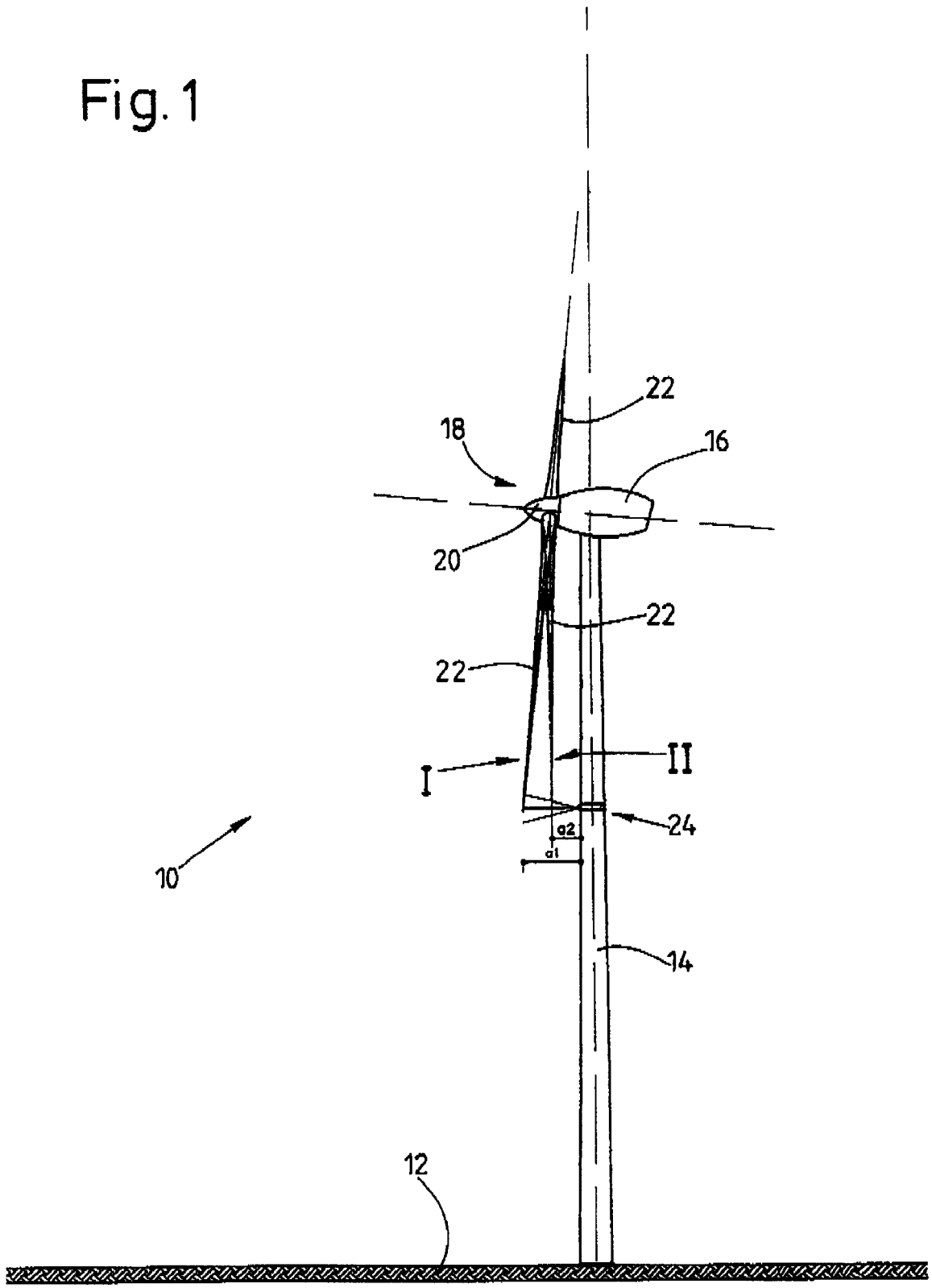
FIG. 1 shows a side view of a wind energy installation which is operated using the method according to the invention.

FIG. 1 shows a wind energy installation 10 which has a gondola 16, arranged on the top of the tower, at the upper end of a vertical tower 14 which is arranged on horizontal ground 12. As those skilled in the art in this field know, a wide range of embodiments are feasible for the detailed design of a tower of a wind energy installation. The invention is, of course, not restricted to the truncated-conical shape of the tower 14 described in the drawing.

A rotor 18 is arranged at an end of the gondola 16 facing the wind, and has a hub 20. Three rotor blades 22 are connected to the hub 20, with the rotor blade roots of the rotor blades 22 being inserted into 25 appropriate openings in the hub 20, and being connected to it in a known manner.

The rotor 18 rotates about an axis which is inclined slightly upwards with respect to the horizontal. As soon as wind strikes the rotor blades 22, the rotor 18 together with the rotor blades 22 is caused to rotate about the rotor axis. During the process, the rotor blades 22 cover a circular area. The individual positions of the rotor blades 22 with respect to the wind can be varied by means of an adjustment device, which is not illustrated but is known to those skilled in the art in this field, that is to say the incidence angle of the rotor blades 22 with respect to the wind is adjustable.

The basic design of the wind energy installation 10 with an at least approximately horizontal rotor axis is known from the prior art, so that this will not be described in detail.

As can be seen in the drawing, a rotor blade 22 which is pointing downwards is, so to speak, passing the tower, that is to say the rotor blade is passing over the tower 14 at the moment shown in the drawing. In a front view of the wind energy installation 10, which is not illustrated, this rotor blade 22 at least partially covers the upper area of the tower 14. While passing the tower, the rotor blade 22 which is pointing downwards initially points obliquely downwards, then vertically downwards and finally obliquely downwards again.

The rotor blade 22 which is pointing downwards is illustrated in the two positions I and II in the drawing. The position I in this case shows the rotor blade at the moment at which a comparatively small wind load is acting. In contrast, the wind load in the position II is greater, as a result of which the rotor blade 22 which is pointing downwards is bent in the direction of the tower 14. This position II accordingly corresponds to a time at which the wind energy installation 10 is subject to considerably greater wind speeds than in the position I.

As can clearly be seen, this bending of the rotor blade 22 which is pointing downwards in the direction of the tower 14 reduces the distance between the rotor blade tip from the position I to the position II. The distance in the position I corresponds to the reference symbol a.1, and the distance in the position II corresponds to the reference symbol a2.

If the wind load were to increase even further, greater bending of the rotor blades 22 towards the tower 14 could occur, in the worst case even the rotor blade tips touching the tower while in each case passing over it. In order to effectively prevent this, a distance measurement device with a distance sensor 24 is provided. The distance sensor 24 is arranged on the upper half of the tower 14 of the wind energy installation 10. This is an optical measurement system with a radiation source. The radiation source emits the light emerging from it forwards in the horizontal direction, that is to say towards that side of the wind energy installation 10 which faces the wind. The radiation source is arranged in such a manner that, as a rotor blade 22 passes the tower, the light from the radiation source strikes that side of the respective rotor blade 22 which is facing away from the wind, and is reflected from there. The reflected light can be received by means of a light receiver, which cannot be seen explicitly, but is arranged approximately at the same position as the light source of the distance measurement device. The distance a to the rotor blade 22 which is respectively passing the tower, specifically the distance between the rotor blade tip and the light source 24 and thus the tower 14, can be derived from the reflected light.

The distance between the rotor blade tip of each rotor blade 22 and the tower is measured by means of the distance measurement device as each blade passes the tower.

The respective signals from the distance measurement device are supplied to a closed-loop control unit (which is not illustrated) for the wind energy installation 10. The wind incidence angles of the rotor blades 22 of the wind energy installation 10 are adjusted as a function of the respectively measured distance between the rotor blade tip of each rotor blade 22 and the tower 14. As soon as the distance between the rotor blade tip and the tower 14 becomes too small, the rotor blades 22 are rotated somewhat out of the wind, so that the wind load acting on the rotor blades 22 is reduced.

If, in the worst case, a critical minimum value of the distance were to be undershot, for example as a result of a strong gust, the wind energy installation 10 is shut down immediately and completely. This means that all of the rotor blades 22 are rotated completely out of the wind and, furthermore, the rotor is subjected to full braking by means of mechanical brakes. This is intended to prevent a rotor blade 22 from touching the tower before it next passes by.

There are a wide range of options, as known to those skilled in the art in this field, for the detailed designs of the open-loop/closed-loop control programs.

LIST OF REFERENCE SYMBOLS 10 wind energy installation
12 Ground
14 Tower
16 Gondola
18 Rotor
20 Hub
22 Rotor blade
24 Distance sensor

What is claimed is:

1. A method for operation of a wind energy installation (10), with the wind energy installation (10) having a rotor (18) that is driven by wind and that has at least one rotor blade (22), a generator for conversion of the mechanical energy of the rotor (18) to electrical energy, and a tower (14) on which the rotor (18) is arranged, comprising the step of
measuring at least one measurement variable by means of a suitable measurement device during operation of the wind energy installation (10),
wherein the at least one measurement variable is a measure of the bending of the at least one rotor blade (22) in the tower direction as a result of a given wind load, and is thus a measure of the risk of the at least one rotor blade (22) colliding with the tower (14) of the wind energy installation (10) as the at least one rotor blade passes the tower,
with at least one operating parameter of the wind energy installation (10) being adjusted as a function of the at least one measurement variable for determination of the at least one rotor blade bending,
wherein the at least one measurement variable is the physical distance between the at least one rotor blade (22) and the tower (14), the physical distance being measured at a predetermined point in an area in which the at least one rotor blade passes the tower by means of a distance measurement device during operation of the wind energy installation (10) during a plurality of times at which the at least one rotor blade (22) passes the tower,
wherein the at least one operating parameter of the wind energy installation (10) is adjusted as a function of the measured distance.

2. The method according to claim 1, wherein the wind incidence angle or angles of the at least one rotor blade (22) of the wind energy installation (10) is adjusted as a function of the at least one measurement variable for determination of the at least one rotor blade bending.

3. The method according to claim 1, wherein, if the actual value of the at least one measurement variable for determination of the at least one rotor blade bending is less than or equal to a predetermined minimum value, further rotation of the at least one rotor blade (22) is suppressed.

4. The method according to claim 1, wherein, if the measured physical distance value is less than or equal to a predetermined minimum physical distance value, the further rotation of the at least one rotor blade (22) is suppressed.

5. The method according to claim 1, wherein the wind incidence angle or angles of the at least one rotor blade (22) is increased in order to increase the distance between the at least one rotor blade (22) and the tower (14) of the wind energy installation (10).

6. The method according to claim 1, wherein the distance between the at least one rotor blade (22) and the tower (14) is measured at the point at which the at least one rotor blade (22) and the tower (14) are closest to one another in the horizontal direction.

7. The method according to claim 1, wherein the distance between the at least one rotor blade (22) and the tower (14) is measured in the area of the at least one rotor blade tip.

8. The method according to claim 1, wherein the at least one measurement variable is measured more than once.

9. The method according to claim 3, wherein the further rotation of the at least one rotor blade (22) is suppressed by braking of the rotor (18) and/or by shutting down or stopping the wind energy installation (10).

10. The method according to claim 4, wherein the further rotation of the at least one rotor blade (22) is suppressed by braking of the rotor (18) and/or by shutting down or stopping the wind energy installation (10).

* * * * *

UNITED STATES PATENT AND TRADEMARK OFFICE
CERTIFICATE OF CORRECTION

PATENT NO. : 7,638,894 B2
APPLICATION NO. : 11/539127
DATED : December 29, 2009
INVENTOR(S) : Matthias Stommel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this

Ninth Day of November, 2010

David J. Kappos
*Director of the United States Patent and Trademark Office*